US012662247B2

(12) United States Patent
    Provenza

(10) Patent No.: US 12,662,247 B2
(45) Date of Patent: Jun. 23, 2026

(54) DYNAMIC STORE EJECTION SYSTEM

(71) Applicant: Government of the United States, as represented by the Secretary of the Air Force, Wright-Patterson AFB, OH (US)

(72) Inventor: Jerry Provenza, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 329 days.

(21) Appl. No.: 18/319,446

(22) Filed: May 17, 2023

(65) Prior Publication Data

US 2023/0373624 A1    Nov. 23, 2023

Related U.S. Application Data

(60) Provisional application No. 63/342,745, filed on May 17, 2022.

(51) Int. Cl.
    B64D 1/12        (2006.01)
    B64D 1/06        (2006.01)
(52) U.S. Cl.
    CPC . B64D 1/12 (2013.01); B64D 1/06 (2013.01)
(58) Field of Classification Search
    CPC .... F41F 5/00; B64D 1/02; B64D 1/04; B64D 1/06; B64D 1/12; F42B 3/04
    See application file for complete search history.

(56) References Cited

U.S. PATENT DOCUMENTS

| | | | | | |
|---|---|---|---|---|---|
| 4,246,472 | A | * | 1/1981 | Sun | B64D 1/06 |
| | | | | | 235/401 |
| 4,543,873 | A | * | 10/1985 | Stock | B64D 1/06 |
| | | | | | 244/130 |
| 5,088,664 | A | * | 2/1992 | Ellis | B64D 1/06 |
| | | | | | 294/82.26 |
| 5,092,542 | A | * | 3/1992 | Ellis | B64D 1/06 |
| | | | | | 244/137.4 |
| 5,487,322 | A | * | 1/1996 | Rhodes | B64D 1/04 |
| | | | | | 89/1.56 |

(Continued)

FOREIGN PATENT DOCUMENTS

| | | | | | |
|---|---|---|---|---|---|
| CA | 2768942 | C | * | 1/2017 | F42B 3/107 |
| WO | WO-2022251956 | A1 | * | 12/2022 | B64D 1/22 |

*Primary Examiner* — Benjamin P Lee

(74) *Attorney, Agent, or Firm* — AFMCLO/JAZ; Richard M. Mescher

(57)        ABSTRACT

A store ejection system for ejecting a store from an aircraft includes a store ejector having a plurality of suspension hooks for releasing the store, and a plurality of ejector pistons for pushing the store downward and away, a force adjuster configured to adjust a force setting that determines a force the ejector pistons of the store ejector to push the store, a pitch adjuster configured to adjust a pitch setting that determines a pitch the ejector pistons of the store ejector to push the store, and a controller configured to continuously receive current flight conditions of the aircraft, to signal the force adjuster to adjust the force setting to a desired force based on the current flight conditions and the pitch adjuster to adjust the pitch setting to a desired pitch based on current flight conditions, and to signal the store ejector to release and eject the store.

20 Claims, 5 Drawing Sheets

(56)                    References Cited

U.S. PATENT DOCUMENTS

| | | | | |
|---|---|---|---|---|
| 7,007,895 B2 | 3/2006 | Jakubowski et al. | | |
| 7,954,765 B2 | 6/2011 | Jakubowski et al. | | |
| 8,127,656 B1 | 3/2012 | Yuan et al. | | |
| 8,708,283 B2 | 4/2014 | Tobias et al. | | |
| 9,505,495 B2 | 11/2016 | Tobias et al. | | |
| 10,710,721 B2 * | 7/2020 | Provenza | B64D 1/04 | |
| 10,935,351 B2 * | 3/2021 | Provenza | B64D 1/02 | |
| 11,279,483 B2 | 3/2022 | Provenza | | |
| 2004/0159739 A1 * | 8/2004 | Jakubowski, Jr. | B64D 1/02 | |
| | | | 244/10 | |
| 2009/0100996 A1 * | 4/2009 | Jakubowski, Jr | B64D 1/04 | |
| | | | 89/1.54 | |
| 2012/0132757 A1 * | 5/2012 | Olden | B64D 1/12 | |
| | | | 244/137.1 | |
| 2013/0048790 A1 * | 2/2013 | Tobias | B64D 1/06 | |
| | | | 244/137.4 | |
| 2014/0076156 A1 * | 3/2014 | Tobias | B64D 1/12 | |
| | | | 91/526 | |
| 2015/0122949 A1 * | 5/2015 | Thevenot | B64D 1/12 | |
| | | | 244/137.4 | |
| 2017/0144760 A1 * | 5/2017 | Tobias | B64D 1/06 | |
| 2017/0327227 A1 * | 11/2017 | Tobias | B64D 1/12 | |
| 2020/0148355 A1 | 5/2020 | Provenza | | |
| 2020/0148356 A1 * | 5/2020 | Provenza | B64D 1/04 | |
| 2020/0200511 A1 * | 6/2020 | Provenza | F41F 5/00 | |
| 2020/0391836 A1 | 12/2020 | Provenza | | |
| 2021/0114733 A1 | 4/2021 | Provenza | | |
| 2023/0094670 A1 * | 3/2023 | Tobias | B64D 1/12 | |
| | | | 60/407 | |

* cited by examiner

DYNAMIC STORE EJECTION SYSTEM

CROSS-REFERENCE TO RELATED APPLICATIONS

This application claims the benefit of priority under 35 U.S.C. § 119(e) to U.S. Provisional Application Ser. No. 63/342,745, entitled "Dynamic Store Ejection", filed 17 May 2022, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to store ejection systems, and more particularly to store eject systems having adjustable force and pitch settings.

2. Description of the Related Art

Store ejection systems are commonly used on military aircraft to carry and release stores such as bombs, missiles, and other weapons. They can also carry and release other materials such, for example but not limited to, auxiliary fuel tanks and the like. Such store ejection systems are typically mounted on an underside of the aircraft at a hardpoint such as, for example but not limited to, a wing pylon or in a fuselage bay. Stores are typically supported from the store ejection system by a pair of suspension hooks.

In order to avoid collision with the aircraft, the store is typically ejected or forced away from the airflow surrounding the aircraft after the store is released from the suspension hooks. The store ejection system typically includes forward and rearward ejector pistons that push the store downward and away from the aircraft. Compressed fluid such as, for example but not limited to, compressed air is commonly used as the medium for ejecting the pistons outwardly to eject the store clear of the aircraft. The compressed air is commonly provided by pyrotechnic cartridges (referred to as a hot air system) or compressed air reservoirs (referred to as a cold air system).

In addition to ejecting the store away from the airflow surrounding the aircraft, it is necessary to eject the store in a controlled manner in order to avoid problems associated with improper store separation. In the case where the store is a weapon, such problems can result in a failure of the weapon to deploy. Improper store separation can also result in tumbling of the store which can compromise the functionality of guidance systems within the store. In extrema cases, improper store separation can result in the store striking the aircraft which can result in loss of the aircraft and its crew.

Some store ejection systems include a means for controlling the pitch of the store upon ejection. Methods to control the pitch of the store include varying the amount of ejection force at the forward and reward ejector pistons. For example, but not limited to, in order to produce a nose down the force at the forward ejector piston is greater than the force at the aft ejector piston. This disparity in force has been provided by using metering devices that apportion the amount of gas flowing to each of the ejector pistons.

Unfortunately, the ejection force and the pitch must be manually set munition handlers while the aircraft on the ground. The munition handlers must select from a limited number of predetermined force and pitch settings. The selection is based on the flight conditions predicted to occur when the stores are to be ejected. Once in the air, pilots are required to stay within a narrow tactical flight envelope (with constraints on aircraft altitude, velocity, attitude and maneuverability etc.) to eject stores. This narrow tactical envelope is at least partly based on the predetermined force and pitch settings of the store ejection system. The resultant tactical envelope of such aircraft is much smaller than the operational envelope of the aircraft as shown in FIG. 1.

Many new high-performance military aircraft release stores over a wider range of flight conditions. This may include operating the aircraft at supersonic speeds. Thus, the difference between the tactical envelopes and the operational envelopes may be increasing with some aircraft.

Tactical fighter pilots hate to slow down to drop bombs. Therefore, there is a need for store ejection systems which increase the tactical envelope of such aircraft.

BRIEF SUMMARY

In one aspect, the present disclosure provides a store ejection system for releasing and ejecting a store from an aircraft. The store ejection system comprises a store ejector having a plurality of suspension hooks for supporting and selectively releasing the store, and a plurality of ejector pistons for selectively pushing the store downward and away, at least one force adjuster configured to selectively adjust a force setting that determines a force the ejector pistons of the store ejector push the store, at least one pitch adjuster configured to selectively adjust a pitch setting that determines a pitch the ejector pistons of the store ejector push the store, and at least one controller having at least one processor and memory, and configured to continuously receive current flight conditions of the aircraft, to signal the force adjuster to adjust the force setting to a desired force based on the current flight conditions and the pitch adjuster to adjust the pitch setting to a desired pitch based on current flight conditions, and to signal the store ejector to release and eject the store upon receiving a release signal.

In another aspect, the present disclosure provides a method for releasing and ejecting a store from an aircraft. The method comprises the steps of (a) receiving current flight conditions of the aircraft by a controller having at least one process and memory, (b) after step (a), determining desired force and pitch settings by the controller for the current flight conditions; and automatically adjusting current force and pitch settings to the desired force and pitch settings using force and pitch adjusters, (c) determining by the controller whether an instruction to release the store has been received, and (d) if an instruction to release the store has been received, releasing and ejecting the store away from the aircraft.

In an additional aspect, the present disclosure provides an aircraft comprising a store ejector having a plurality of suspension hooks for supporting and selectively releasing the store, and a plurality of ejector pistons for selectively pushing the store downward and away from the aircraft, at least one force adjuster configured to selectively adjust a force setting that determines a force the ejector pistons of the store ejector push the store away from the aircraft, at least one pitch adjuster configured to selectively adjust a pitch setting that determines a pitch the ejector pistons of the store ejector push the store away from the aircraft, and at least one controller having at least one processor and memory, and configured to continuously receive current flight conditions of the aircraft, to signal the force adjuster to adjust the force setting to a desired force based on the current flight conditions and the pitch adjuster to adjust the pitch setting to a desired pitch based on current flight conditions, and to signal the store ejector to release and eject the store upon receiving a release signal.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The present disclosure provides a high-performance, digitally programmable, store ejection system to be used on conventional and future high-performance aircraft. The overall or final output of the system is to dynamically adjust in-flight store pitch rates and ejection forces in order to improve performance and safety.

Figure 1:
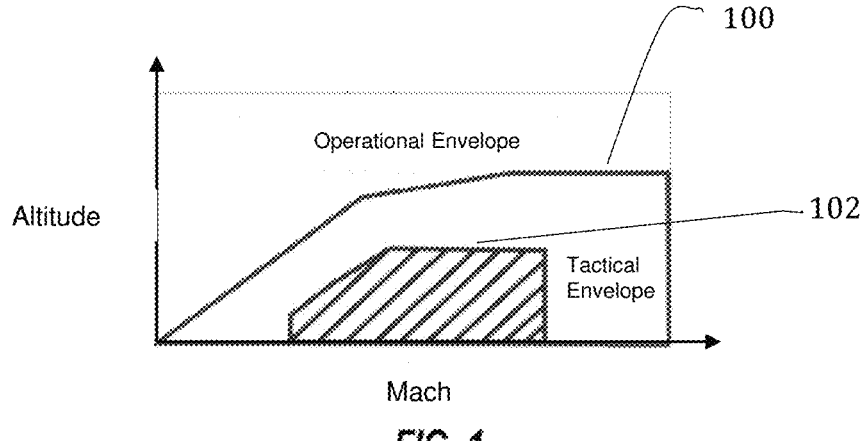
FIG. 1 illustrates a diagram of an operational envelope of a tactical aircraft that encompasses a tactical envelope of the tactical aircraft, according to one or more embodiments of the invention.

FIG. 1 illustrates a diagram of an operational envelope 100 that encompasses a tactical envelope 102 of a tactical aircraft. The present disclosure provides a system that adjusts force and pitch settings dynamically to provide improved aircraft targeting, performance and safety while expanding the tactical envelope 102 closer to the operational envelope 100.

In particular, the present disclosure addresses deficiencies in conventional tactical store ejection. High performance aircraft are required to select from a set of limited force and pitch settings prior to flight while on the ground by munition handlers. Force is commonly selected from a few pyrotechnic cartridge propellant loads and the pitch valve setting is usually limited to just a few variations. Because these ejector and pitch settings are preset on the ground, the pilot is forced to stay within a narrow tactical flight envelope 102 with constraints on aircraft velocity, maneuverability and attitude etc. when ejecting a store. The resultant tactical envelope 102 is much smaller than the operational envelope 100 of the aircraft. The purpose of the present invention is to provide a system that adjusts force and pitch settings dynamically in-flight to provide improved aircraft performance and safety. In addition, the present invention will allow the pilot to make more aggressive maneuvering prior to and during the release of stores.

Figure 2:
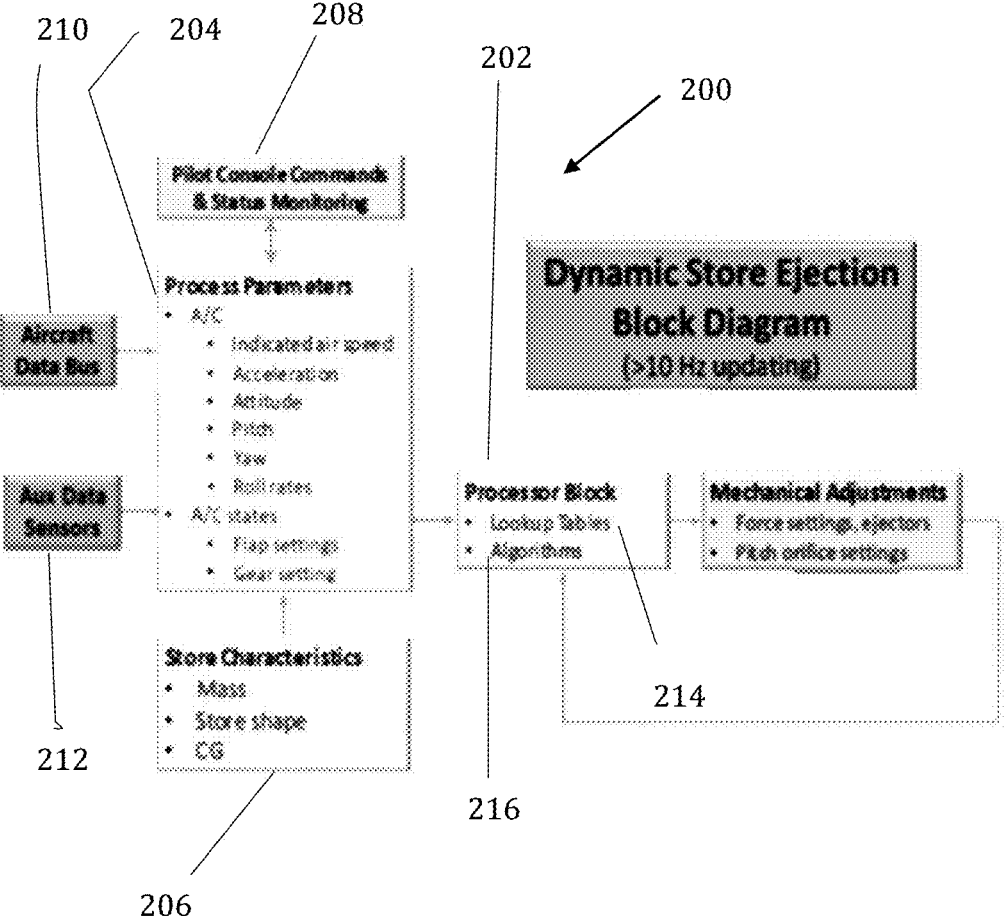
FIG. 2 illustrates a functional block diagram of a tactical aircraft with a dynamic store ejection system according to one or more embodiments of the invention.

FIG. 2 illustrates a functional block diagram of dynamic store ejection system 200 according to the present invention. The illustrated dynamic store ejection system 200 is a high performance, digitally programmable, store ejection system to be used on conventional and future high-performance aircraft. The final output of the dynamic store ejection system 200 is to dynamically adjust in-flight store pitch rates and ejection forces to improve performance and safety. The illustrated dynamic store ejection system 200 includes a controller 202 that monitors and tracks process parameters 204 and store characteristics 206. The controller 202 can be an embedded controller, an embedded micro-computer, a field programmable gate array, or any other suitable processing device. The processing function of the controller 202 could be accomplished by the main aircraft flight processor or alternatively for small systems and/or large systems, an embedded processor could be added to the aircraft or the store carriage system as an additional independent black box.

The controller 202 can receive any desired number of process parameters 204 from a limited set of just a few key process parameters 204 defining a basic system to a very large and complex set involving very high-speed processing of a hundred or more process parameters 204. The illustrated process parameters 204 include: aircraft forward indicated airspeed, multi-axis accelerations, altitude/temperature, pitch, yaw, roll rates, dynamic pressure, and angle of attack, and aircraft states of flap/spoiler settings and gear settings. It is noted that the process parameters 204 can include any other suitable process parameters. The illustrated process parameters 204 are obtained from the pilot console commands and status monitoring 208, the aircraft data bus 210, and auxiliary data sensors 212. It is noted that the process parameters 204 can alternatively or additionally be obtained in any other suitable manner. It is noted that most of these process parameters 204 are already being monitored and displayed for the pilot's situational awareness. In these cases, it would be very efficient to tap into this existent data set. The illustrated store characteristics 206 include mass, store shape, and center of gravity. It is noted that the store characteristics 206 can include any other suitable store characteristics. The process parameters and store characteristics will be collectively referred to herein as "aircraft flight conditions".

The aircraft flight conditions are digitally processed by the controller 202 and presented to a predefined lookup table 214 of ejector force and pitch settings for current aircraft flight conditions and/or applied to a pre-coded algorithm 216 that is used to select ejector force and pitch settings for the current flight conditions. The controller 202 drives operation of the store carriage and ejection mechanisms to make adjustments to ejector force and pitch settings based on the current aircraft conditions. The adjustments to the force and pitch settings are made by force and pitch adjustors such as, for example but not limited to mechanically actuated valves and orifices. The information regarding the adjustments is fed back to the controller 202.

Figure 3:
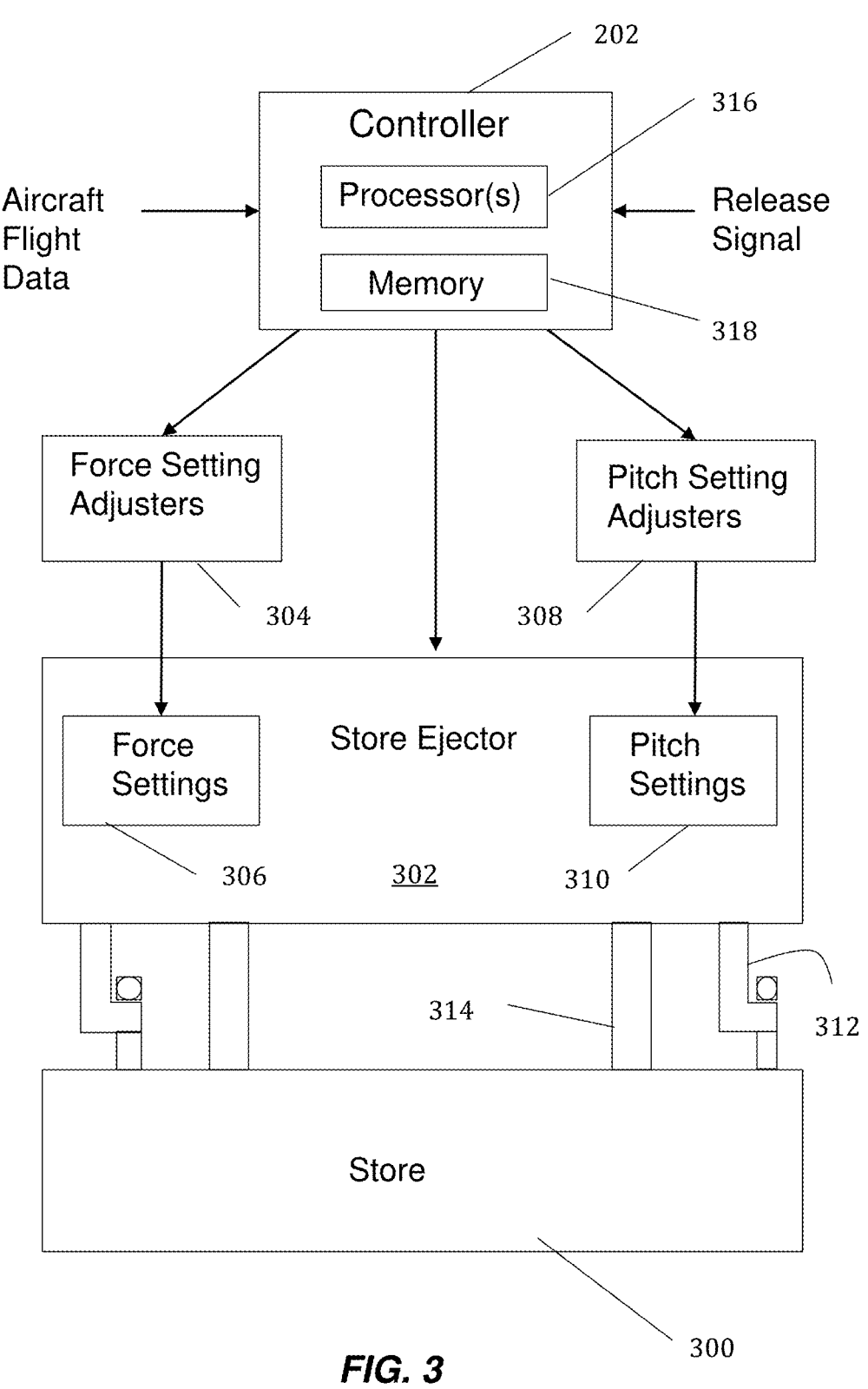
FIG. 3 illustrates a block diagram of a dynamic store ejection system according to one or more embodiments of the invention.

FIG. 3 is a structural block diagram for an embodiment of the dynamic store ejection system 200 according to the present invention. The illustrated store ejection system 200 for releasing and ejecting a store 300 from an aircraft includes the controller 202, a store ejector 302 in communication with the controller 202, at least one force adjuster 304 in communication with the controller 202 and operably connected to a force setting 306, at least one pitch adjuster 308 in communication with the controller 202 and operably connected to a pitch setting 310.

The illustrated store ejector 302 has a plurality of suspension hooks 312 for supporting and selectively releasing the store, and a plurality of ejector pistons 314 for selectively pushing the store downward and away from the aircraft. The illustrated suspension hooks 312 and the illustrated pistons 314 can operate in any conventional manner. It is noted that there can be any other suitable quantity of suspension hooks 312 and/or the store 300 can be alternatively releasably suspended in any other suitable manner. It is also noted that there can be any other suitable quantity of pistons 312 and/or the store 300 can be alternatively pushed in any other suitable manner. It is also noted that the store ejector can have any other suitable configuration.

The illustrated force adjuster 304 is configured to selectively adjust the force setting 306 that determines the force that the ejector pistons 314 of the store ejector 302 push the store 300. The force adjuster 304 can be of any suitable configuration for adjusting the force setting 306 depending on the specific construction of the store ejector. For example, but not limited to, the adjustment can be made mechanically, electrically, pneumatically, hydraulically, or any combination thereof (such as a solenoid motor, solenoid actuator or the like). See for example, U.S. Pat. No. 7,007,895 titled "Variable flow Restricting Devices" which adjusts a valve to adjust the flow of compressed air and thus the force. Also see for example, U.S. Pat. No. 10,935,351 titled "Selectable force gas generator", U.S. Pat. No. 10,710,721 titled "Airborne store ejection using selectable force gas generator", and U.S. Pat. No. 11,279,483 titled "Modular weapon carriage and deployment (MWCD) system" each of which vary the number pyrotechnic cartridges to vary the flow of compressed gas and thus the force. It is noted that the force adjuster 304 can have any other suitable configuration.

The illustrated pitch adjuster 308 is configured to selectively adjust a pitch setting 310 that determines a pitch for the store ejector 302 to push the store 300 away from the aircraft. The pitch adjuster 308 can be of any suitable configuration for adjusting the pitch setting depending on the specific construction of the store ejector 302. For example, but not limited to, the adjustment can be made mechanically, electrically, pneumatically, hydraulically, or any combination thereof (such as a solenoid motor, solenoid actuator or the like). See for example, U.S. Pat. No. 8,127, 656 titled "General Purpose Pneumatic Power Module", which includes a manually selectable pitch valve to vary the pitch setting, and U.S. Pat. No. 7,954,765 titled "System and Method for In-flight Adjustment of Store Ejector Gas Orificing" which varies an orifice to vary the pitch setting. which includes a manually selectable pitch valve to vary the pitch setting. It is noted that the pitch adjuster 308 can have any other suitable configuration.

The illustrated controller 202 has at least one processor 316 and memory 318, and is configured to continuously receive and monitor current flight conditions of the aircraft and also store release signals form the aircraft, to determine whether current flight conditions require a force and or pitch setting adjustment, to signal the force adjuster 304 to adjust the force setting 306 to a desired force based on the current flight conditions and/or the pitch adjuster 308 to adjust the pitch setting 310 to a desired pitch based on current flight conditions, and to signal the store ejector 302 to release and eject the store 300 upon receiving a release signal from the aircraft. The memory stores the lookup table 214 and/or the algorithm 216. The controller is configured and programmed to carry out all or a portion of the functions described herein. It is noted that the controller 202 can alternatively have any other suitable configuration.

Figure 4:
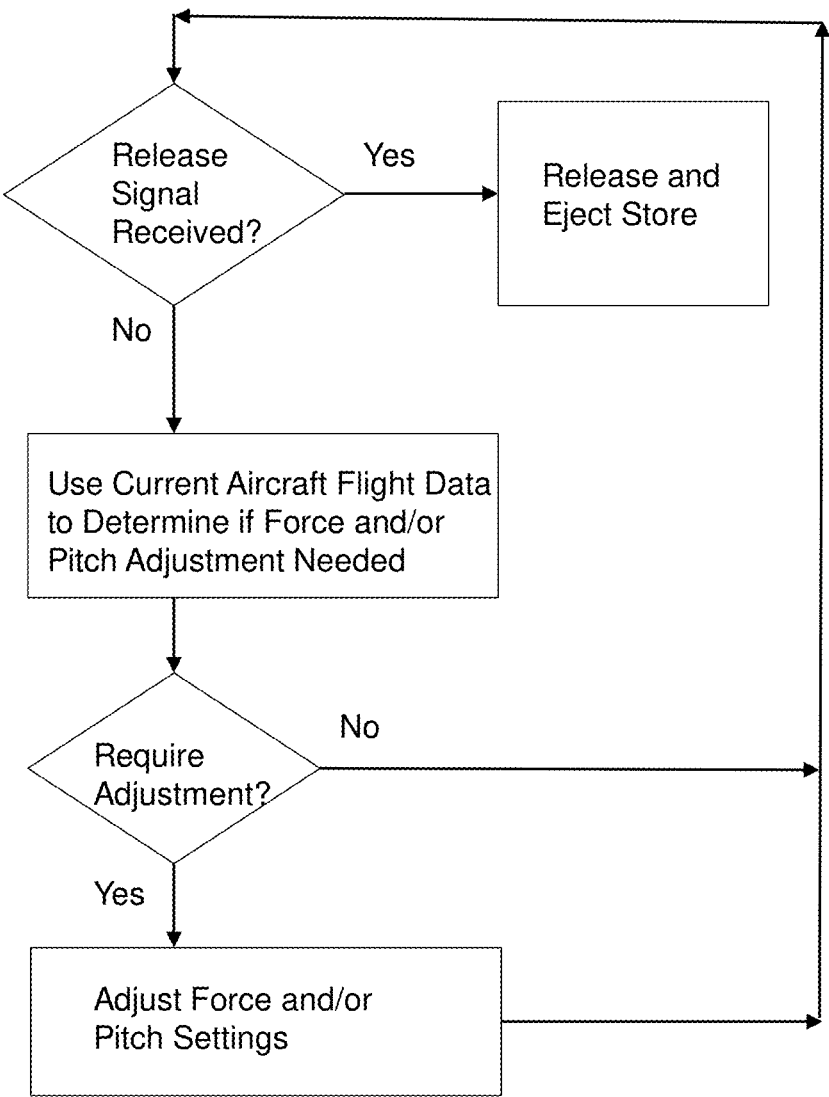
FIG. 4 illustrates a flow diagram for the operation of a dynamic store ejection system according to the present invention.

FIG. 4 is a flow diagram showing embodiments of a control loop or method for releasing and ejecting stores 300 from an aircraft according to the present invention. The illustrated method includes the steps of determining by the controller 202 whether an instruction to release the store 300 has been received. If an instruction to release the store 300 has been received by the controller 202, the store 300 is released and ejected e away from the aircraft. The controller 202 is continuously receiving current flight conditions of the aircraft by the controller 202. If an instruction to release the store 300 has not been received by the controller 202, the controller 202 determines desired force and pitch settings by the controller 202 for the current flight conditions and automatically sends signals to adjust the current force and/or pitch settings 306, 310 to the desired force and pitch settings 306, 310 using the force and/or pitch adjusters 304, 308. In one embodiment, the controller 202 only automatically sends signals to adjust current force and/or pitch settings 306, 310 to the desired force and pitch settings 306, 310 using the force and pitch adjusters 304, 308 if the current force and/or pitch settings 306, 310 are different than the desired force and pitch settings 306, 310 after the controller 202 determines if they are different. In an alternative embodiment, the controller 202 only automatically sends signals to adjust the current force and/or pitch settings 306, 310 to the desired force and pitch settings 306, 310 using the force and/or pitch adjusters 304, 308 without determining whether they are different. If an adjustment is not required, the controller 202 returns to the beginning of the control loop. After an adjustment is performed, the controller 202 also 202 returns to the beginning of the control loop. The controller 202 automatically continues this control loop at a desired rate such as, for example but not limited to, greater than 10 hertz. It is noted that the control loop can alternatively have any other suitable configuration.

Figure 5:
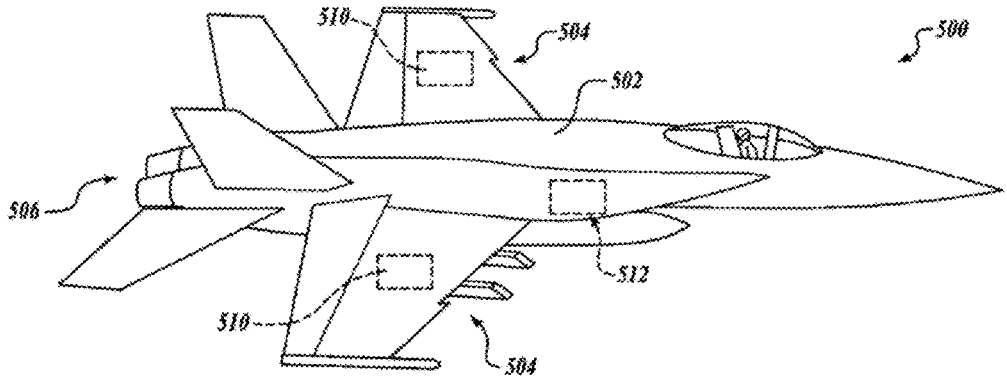
FIG. 5 illustrates a tactical aircraft with a dynamic store ejection system according to one or more embodiments of the invention.

FIG. 5 is a side view of an aircraft 500 which includes a fuselage 502, a pair of wings 504, and at least one engine 506. The aircraft further includes a pair of dynamic store ejection systems 510 in accordance with the present invention on the lower surfaces of each of the wings 504. In alternative embodiments, a dynamic store ejection system 512 according to the present invention is additionally or alternatively mounted to the fuselage 502. Although the aircraft 500 is representative of a well-known fighter aircraft, specifically an F/A-F 15E Super Hornet manufactured by the Boeing Company, in alternative embodiments virtually any other type or variety of military aircraft can utilize the systems and methods of the present invention. For example, but not limited to, fighter aircraft, rotary aircraft, bomber aircraft, or any other suitable manned or unmanned aircraft.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The disclosure of all patents, patent applications (and any patents which issue thereon, as well as any corresponding published foreign patent applications), and publications mentioned throughout this description are hereby incorporated herein in their entirety by reference. It is expressly not admitted, however, that any of the documents incorporated by reference herein teach or disclose the present invention.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A dynamic store ejection system for releasing and ejecting a store from an aircraft having an operational envelope said store ejection system comprising:

a store ejector having a plurality of suspension hooks for supporting and selectively releasing the store, and a plurality of ejector pistons for selectively pushing the store downward and away;

at least one force adjuster configured to selectively adjust a force setting that determines a force the ejector pistons of the store ejector push the store;

at least one pitch adjuster configured to selectively adjust a pitch setting that determines a pitch the ejector pistons of the store ejector push the store;

wherein the store has store characteristics comprising at least mass, shape, and center of gravity, wherein current flight conditions comprise indicated air speed, multi-axis accelerations, altitude/temperature, pitch, yaw, roll rates, dynamic pressure, and angle of attack;

at least one controller having at least one processor and memory, and configured to continuously receive the current flight conditions of the aircraft during flight and to receive the store characteristics, to continuously digitally process the received current flight conditions during flight, to automatically and continuously signal the force adjuster during flight to adjust the force setting to a desired force based on the current flight conditions and the characteristics of the store and the pitch adjuster during flight to adjust the pitch setting to a desired pitch based on current flight conditions and the characteristics of the store, and to signal the store ejector to release and eject the store upon receiving a release signal during flight while the aircraft is anywhere within its operational envelope; and wherein the at least one controller updates the desired force and the desired pitch and adjusts the force setting to the desired force and the pitch setting to the desired pitch at a rate greater than 10 Hz.

2. The dynamic store ejection system according to claim 1, wherein the force adjuster operates a valve and/or adjusts an orifice.

3. The dynamic store ejection system according to claim 1, wherein the pitch adjuster operates a valve and/or adjusts an orifice.

4. The dynamic store ejection system according to claim 1, wherein the flight conditions include flap/spoiler settings and gear settings.

5. The dynamic store ejection system according to claim 1, wherein the aircraft flight conditions are digitally processed by the controller and presented to a predefined lookup table of the ejector force and pitch settings for the current aircraft flight conditions that is used to select the ejector force and pitch settings for the current flight conditions.

6. The dynamic store ejection system according to claim 1, wherein the aircraft flight conditions are digitally processed by the controller 202 and applied to at least one pre-coded algorithm that is used to select the ejector force and pitch settings for the current flight conditions.

7. A method for releasing and ejecting a store from an aircraft having an operational envelope using a dynamic store ejection system, said method comprising the steps of:

(a) continuously receiving current flight conditions during flight of the aircraft and receiving store characteristics by at least one controller having at least one processer and memory, wherein the current flight conditions comprise indicated air speed, multi-axis accelerations, altitude/temperature, pitch, yaw, roll rates, dynamic pressure, and angle of attack and wherein store characteristics comprise mass, shape and center of gravity of the store;

(b) after step (a), to continuously digitally processing the received current flight conditions during flight, continuously determining desired force and pitch settings by the at least one controller based on the current flight conditions during flight and the characteristics of the store; and automatically and continuously adjusting current force and pitch settings during flight to the desired force and pitch settings using force and pitch adjusters, and wherein the at least one controller updates the desired force and the desired pitch and adjusts the force setting to the desired force and the pitch setting to the desired pitch at a rate greater than 10 Hz;

(c) determining by the controller whether an instruction to release the store has been received during flight; and (d) if an instruction to release the store has been received during flight, releasing and ejecting the store away from the aircraft while the aircraft is anywhere within its operational envelope.

8. The method according to claim 7, wherein the step of automatically and continuously adjusting current force and pitch settings during flight to the desired force and pitch settings using force and pitch adjusters is performed only if the current force and pitch settings are different than the desired force and pitch settings.

9. The method according to claim 7, wherein the step of automatically and continuously adjusting current force and pitch settings during flight to the desired force and pitch settings using force and pitch adjusters is performed regardless of whether the current force and pitch settings are different than the desired force and pitch settings.

10. The method according to claim 7, wherein the force adjuster operates a valve and/or adjusts an orifice.

11. The method according to claim 7, wherein the pitch adjuster operates a valve and/or adjusts an orifice.

12. The method according to claim 7, wherein the flight conditions include flap/spoiler settings and gear settings.

13. The method according to claim 7, wherein the aircraft flight conditions are digitally processed by the controller and presented to a predefined lookup table of the ejector force and pitch settings for the current aircraft flight conditions that is used to select the ejector force and pitch settings for the current flight conditions.

14. The method according to claim 7, wherein the aircraft flight conditions are digitally processed by the controller 202 and applied to at least one pre-coded algorithm that is used to select the ejector force and pitch settings for the current flight conditions.

15. An aircraft having an operational envelope, said aircraft comprising:

a dynamic store ejector having a plurality of suspension hooks for supporting and selectively releasing a store, and a plurality of ejector pistons for selectively pushing the store downward and away from the aircraft;

at least one force adjuster configured to selectively adjust a force setting that determines a force the ejector pistons of the store ejector push the store away from the aircraft;

at least one pitch adjuster configured to selectively adjust a pitch setting that determines a pitch the ejector pistons of the store ejector push the store away from the aircraft;

wherein the store has store characteristics including at least mass, shape and center of gravity;

wherein current flight conditions comprise indicated air speed, multi-axis accelerations, altitude/temperature, pitch, yaw, roll rates, dynamic pressure, and angle of attack;

at least one controller having at least one processor and memory, and configured to continuously receive current flight conditions of the aircraft during flight and to receive the store characteristics, to continuously digitally process the received current flight conditions during flight, to automatically and continuously signal the force adjuster to adjust the force setting during flight to a desired force based on the current flight conditions and the characteristics of the store and the pitch adjuster to adjust the pitch setting during flight to a desired pitch based on current flight conditions and the characteristics of the store, and to signal the store ejector to release and eject the store upon receiving a release signal during flight while the aircraft is anywhere within its operational envelope; and wherein the at least one controller updates the desired force and the desired pitch and adjusts the force setting to the desired force and the pitch setting to the desired pitch at a rate greater than 10 Hz.

16. The aircraft according to claim 15, wherein the force adjuster operates a valve and/or adjusts a size of an orifice.

17. The aircraft according to claim 15, wherein the pitch adjuster operates a valve and/or adjusts a size of an orifice.

18. The aircraft according to claim 15, wherein the flight conditions include flap/spoiler settings and gear settings.

19. The aircraft according to claim 15, wherein the aircraft flight conditions are digitally processed by the controller and presented to a predefined lookup table of the ejector force and pitch settings for the current aircraft flight conditions that is used to select the ejector force and pitch settings for the current flight conditions.

20. The aircraft according to claim 15, wherein the aircraft flight conditions are digitally processed by the controller 202 and applied to at least one pre-coded algorithm that is used to select the ejector force and pitch settings for the current flight conditions.

* * * * *